United States Patent
English et al.

(12)

(10) Patent No.: US 7,139,817 B1
(45) Date of Patent: Nov. 21, 2006

(54) MANAGING CONFIGURATION INFORMATION FOR MULTIPLE DEVICES

(75) Inventors: Robert M. English, Menlo Park, CA (US); Szu-Wen Kuo, Milpitas, CA (US); Brian Quirion, San Jose, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 809 days.

(21) Appl. No.: 09/879,840

(22) Filed: Jun. 12, 2001

(51) Int. Cl.
*G06F 15/177* (2006.01)

(52) U.S. Cl. .................. 709/220; 709/221; 709/222; 710/8; 710/9; 710/10; 713/1; 713/2; 713/100

(58) Field of Classification Search .............. 709/220, 709/221, 222
See application file for complete search history.

(56) References Cited

U.S. PATENT DOCUMENTS

| | | | | |
|---|---|---|---|---|
| 5,247,683 | A | * | 9/1993 | Holmes et al. ............. 709/221 |
| 5,604,862 | A | | 2/1997 | Midgely et al. |
| 5,649,152 | A | | 7/1997 | Ohran et al. |
| 5,819,292 | A | | 10/1998 | Hitz et al. |
| 5,835,953 | A | | 11/1998 | Ohran |
| 5,963,962 | A | | 10/1999 | Hitz et al. |
| 6,101,585 | A | | 8/2000 | Brown et al. |
| 6,505,243 | B1 | * | 1/2003 | Lortz ........................ 709/220 |
| 6,757,723 | B1 | * | 6/2004 | O'Toole et al. ............. 709/222 |
| 2002/0073088 | A1 | * | 6/2002 | Beckmann et al. .......... 707/10 |
| 2002/0184512 | A1 | * | 12/2002 | Cardoso, Jr. ............... 713/193 |
| 2002/0184572 | A1 | * | 12/2002 | Lal ............................. 714/43 |
| 2003/0004952 | A1 | * | 1/2003 | Nixon et al. ................ 707/10 |
| 2004/0034763 | A1 | * | 2/2004 | McCardle .................... 713/1 |
| 2005/0027892 | A1 | * | 2/2005 | McCabe et al. ............. 709/253 |

FOREIGN PATENT DOCUMENTS

| | | |
|---|---|---|
| EP | 0308506 A1 | 3/1989 |
| EP | 0702815 B1 | 8/2000 |
| WO | WO 94/29807 A1 | 12/1994 |
| WO | WO 00/07104 A1 | 2/2000 |

OTHER PUBLICATIONS

Mulqueen, John T., "Product Analysis Review". Communications Week. vol. 452, p. 25, May 3, 1993.
Sailesh, Chutani, "The Episode File System", USENIX Winter, 1992. pp. 43-60.
TUX 2: Slashdot.com. TUX2: The File System That Would Be King. Oct. 20, 2000.

* cited by examiner

*Primary Examiner*—Fritz Fleming
*Assistant Examiner*—Niketa Patel
(74) *Attorney, Agent, or Firm*—Blakely, Sokoloff, Taylor & Zafman LLP

(57) ABSTRACT

The invention provides for managing information for multiple devices. Each of a set of devices retrieves information from a sequence of servers. A device when starting up reads a list of file names, reads information from each file in sequence, and resolves conflicts among files to present a consistent configuration on each restart of each device. A file includes a sequence of <name, value> pairs. In those cases when two variables have the same name, an operator associated with the second pair indicates whether to overwrite the first value or to edit the first value, such as by appending the second value. One of the pairs indicates the list of file names itself. When the list of file names is changed, the device for which the change is made re-reads the sequence of files and repeats its determination of the pairs, until the list of file names is stabilized.

19 Claims, 2 Drawing Sheets

MANAGING CONFIGURATION INFORMATION FOR MULTIPLE DEVICES

BACKGROUND OF THE INVENTION

1. Field of the Invention

This invention relates to managing configuration information for multiple devices.

2. Related Art

Each computer system includes information about its internal state, such as where its software elements are located, where data is maintained for those software elements, and the like. As computer systems become relatively large, the amount of that information also becomes relatively large, and the task maintaining that information in a manageable form becomes relatively difficult. For one example, in a cache management system (a system including a set of caching devices each of which maintains relatively local copies of web pages and possibly other network objects obtained from relatively remote origination servers), each one of a set of multiple caches can include information regarding how web pages should be downloaded, how quickly, whether selected client devices can download web pages, where selected web pages would be downloaded from, and the like; when there are many such caches, assuring that each cache has correct and up-to-date information can be detailed and time-consuming. For a second example, there can be multiple devices each having at least some information that is unique for each device and at least some information that is identical for multiple devices. In both examples, management of such information, including assuring that each device has correct and up-to-date information, can be detailed and time-consuming, and therefore error-prone.

A first problem in the known art is that access to multiple devices involves either direct physical access or communication with each such device. Direct physical connections to multiple devices can be inconvenient, such as in those cases where the set of devices is physically dispersed. Using a communication link is subject to the drawback that at least some of the devices might be unavailable at the time. Moreover, both of these methods presume that the manger already knows of the existence (and how to reach) each of the multiple devices, to direct them to use the particular information the manager selects.

Additional problems in the known art include the following: There is no convenient method in the known art for managing both local and remote information for multiple such devices.

There is no convenient method in the known art for managing multiple such devices in groups or subgroups.

There is no convenient method in the known art for managing device information by multiple information managers.

There is no convenient method in the known art for managing device information when those devices are protected by firewalls, without granting access to those devices to managers.

Accordingly, it would be advantageous to provide an improved technique for managing information, particularly configuration information, for multiple devices.

SUMMARY OF THE INVENTION

The invention provides a method and system for managing device information for multiple devices, particularly configuration information. This is achieved in an embodiment of the invention in which each one of a set of devices retrieves information from a sequence of information servers (preferably both local and remote).

In a preferred embodiment, a device when starting up reads a list of configuration file names; reads configuration information from each configuration file in sequence; and resolves conflicts among configuration files to present a consistent configuration on each restart of each device.

In a preferred embodiment, a configuration file includes a sequence of <name, value> pairs, each of which represents a variable having the name <name> and the value <value>. In those cases when two variables have the same name, an operator associated with the second <name, value> pair indicates whether to overwrite the first value or to edit the first value, such as by appending the second value.

In a preferred embodiment, one of the <name, value> pairs indicates the list of configuration file names itself. When the list of configuration file names is changed, the device for which the change is made re-reads the sequence of configuration files and repeats its determination of the <name, value> pairs, until the list of configuration file names is stabilized (until it is possible to re-read the sequence of configuration files without further changes).

In a preferred embodiment, a device when starting up reads a value for the list of configuration file names, equal to the stabilized value determined by the device at the most recent restart.

Those of ordinary skill in the art will recognize, after perusal of this application, the many advantages provided by the invention. These include, but are not limited to, the following:

maintaining information other than configuration information, such as for example information to be communicated among devices or users;

maintaining information by multiple managers or by a hierarchy of managers, such as for example when each manager is assigned a subgroup of the information or a subgroup of the devices to manage;

maintaining information in multiple locations, such as for example when at least part of the information can be found local to devices and at least part of the information can be found remotely from devices.

The invention has general applicability to maintaining information for multiple devices. Although a preferred embodiment is described with regard to configuration information for a set of multiple caches, there is no particular limitation of the invention to caches or similar devices, nor is there any particular limitation of the invention to configuration information. Techniques used by a preferred embodiment of the invention for remotely maintaining information for multiple devices, for resolving conflicts at devices between differing sets of information, and for remotely maintaining information by multiple managers, can be used in contexts other than the specific applications disclosed herein.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using one or more general purpose processors or special purpose processors or other circuits adapted to particular process steps and data structures described herein, and that implementation of the process steps and data structures described herein would not require undue experimentation or further invention.

Lexicography

The following terms refer or relate to aspects of the invention as described below. The descriptions of general meanings of these terms are not intended to be limiting, only illustrative.

- information to be maintained—in general, any values or other data to be recorded in selected locations for possible retrieval by devices for which that information is maintained.
- maintaining information—in general, any operation for creating, modifying, deleting, assigning, or otherwise managing information for possible use by devices.
- local and remote information—in general, local information is that which is accessible by a device without cooperation with any other device, while remote information is that which is accessible by a device using a communication link or a communication protocol to record or retrieve that information.
- device groups—in general, any technique for associating sets of devices with an identifier selecting those devices. Device groups can have zero, one, or more members, and can overlap.
- configuration information—in general, any information used during an initial ("start-up") phase of operation for a device. There is no particular limitation of the invention to information that is not used after start-up.
- configuration file names—in general, any identifier allowing a device to identify a source for configuration information. For one example, such "file names" might be URLs or database queries, rather than names in a filesystem namespace.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

System Elements

Figure 1:
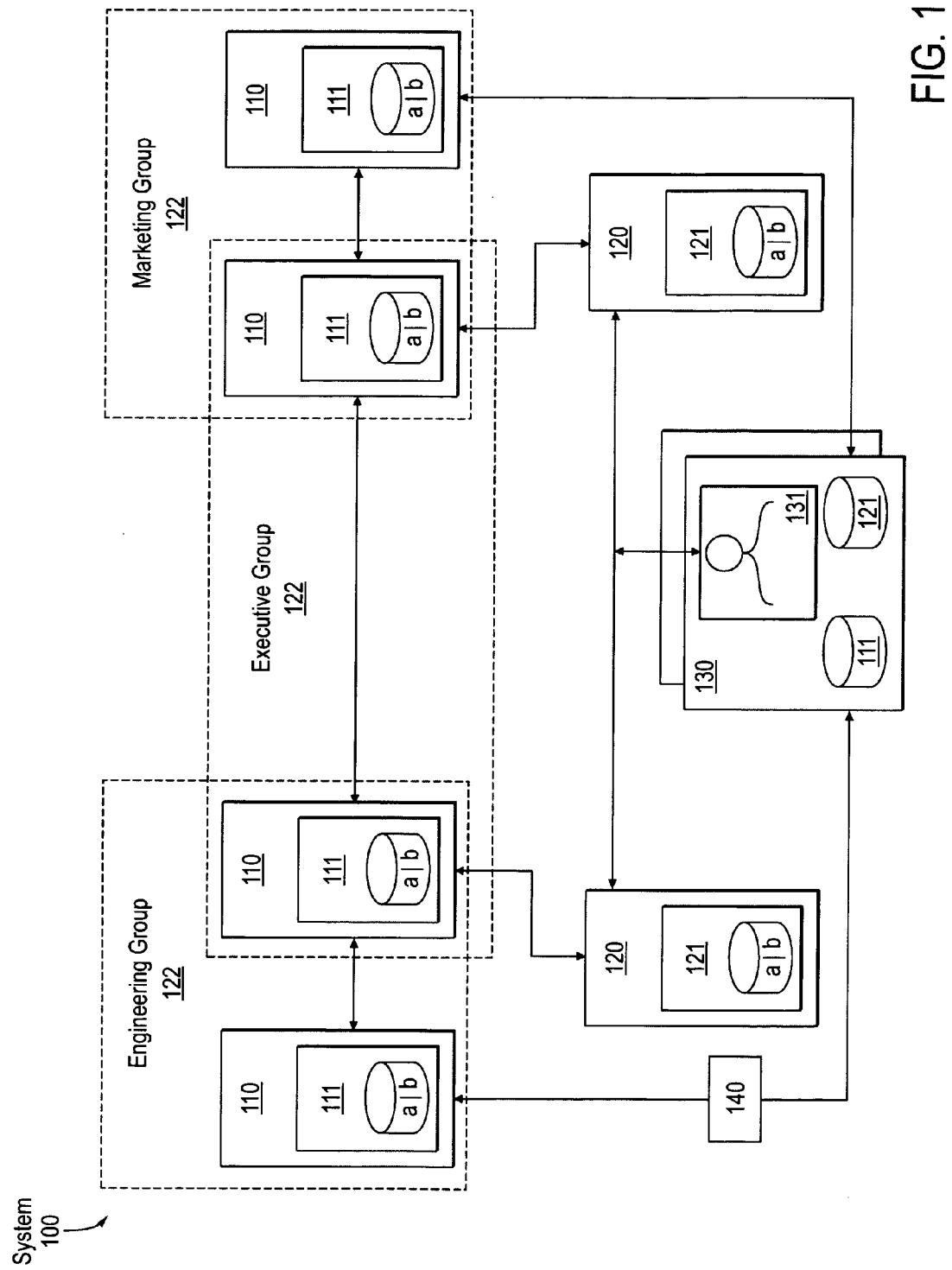
FIG. 1 shows a block diagram of a system capable of managing information for a set of devices.

FIG. 1 shows a block diagram of a system capable of managing information for a set of devices.

A system 100 includes a set of devices 110, a set of configuration servers 120, a set of management consoles 130, and a communication link 140. These elements operate together as described to perform the functions shown herein for the system 100.

Devices

Each device 110 preferably includes a processor, program and data memory, mass storage, and a network interface to the communication link 140. Each device 110 is therefore capable of performing programmed processes and communicating with other elements of the system 100 using the communication link 140. The program and data memory in each device 110 include computer programs and data structures for performing steps described in this application. There is no particular requirement that the devices 110 must include mass storage, merely that at least some of their storage is persistent across restart operations. References herein to mass storage for the devices 110 are intended to be read broadly to include other forms of persistent storage and techniques for retaining information for restarting and communicating with other elements of the system 100.

Each device 110 includes a set of local configuration files 111, having information for use by the device 110. In a preferred embodiment, these local configuration files 111 include at least a default configuration file 11a and a last-boot configuration file 111b. The default configuration file 111a includes information for the device 110 determined by a manufacturer for the device 110. The last-boot configuration file 111b includes information for the device 110 as determined by the device 110 at of its last boot time, as described further in this application.

Each device 110 can have computer programs and data structures capable of defining a relative priority for a first and a second information server in response to a relative position of a first and second information server in a sequence of locations to be read by the device. Each device 110 can have computer programs and data structures capable of selecting the sequence of locations in response to a variable settable in response to at least one information server.

Configuration Servers

Similar to the devices 110, each configuration server 120 preferably includes a processor, program and data memory, mass storage, and a network interface to the communication link 140. Each configuration server 120 is therefore capable of performing programmed processes and communicating with other elements of the system 100 using the communication link 140. Similar to the devices 110, the program and data memory in each configuration server 120 include computer programs and data structures for performing steps described in this application. There is no particular requirement that the configuration servers 120 must include mass storage, merely that at least some of their information is retained sufficient for restarting and communicating with other elements of the system 100.

One or more (or all of the) configuration servers 120 can be located on the same physical device as one of the devices 110, in which case those devices 110 also include program and data information for performing the functions described herein for a configuration server 120.

Each configuration server 120 includes a set of remote configuration files 121, having information for use by one or more devices 110. There is no particular requirement for any arrangement or hierarchy of remote configuration files 121. However, in a preferred embodiment, the remote configuration files 121 include at least one global configuration file 121a, and a set of group configuration files 121b. The global configuration file 121a includes information determined by at least one manager 131 (as further described below) to be for use by substantially all devices 110. The group configuration files 121b include information determined by at least one manager 131 (as further described below) to be for use by devices 110 associated with one or more device groups 122.

For example, a first device group 122 might be associated with those devices in an engineering department of a company, while a second device group 122 might be associated with those devices in a marketing department of a company. There is no particular requirement regarding the arrangement or hierarchy of device groups 122. For example, some devices 110 might be associated with more than one device group 122 (such as for example an "engineering" device group 122 and an "executive" device group 122).

The remote configuration files 121 are accessible by the devices 110 using 1 one or more information transfer protocols. Accordingly, each device 110 includes computer programs and data structures capable of preparing request messages and responding to response messages in at least one such information transfer protocol. Similarly, each configuration server 120 includes computer programs and data structures capable of responding to request messages and preparing response messages in at least one such information transfer protocol. There is no particular requirement that the information transfer protocol be any specific protocol. In a preferred embodiment, the information transfer protocols include HTTP, SHTTP, some similar protocol, or a combination or variant thereof. However, in alternative embodiments, the information transfer protocols may include FTP, FSP, MUD, RSH, an embodiment-specific protocol using a selected port, or a combination or variant thereof.

Although there is no particular requirement therefore, in a preferred embodiment one or more devices 110 might also include remote configuration files 121 ("remote" in the sense that they are remote to other devices 110), accessible by the devices 110 using one or more information transfer protocols. Accordingly, each such device 110 also includes computer programs and data structures capable of responding to request messages and preparing response messages in at least one such information transfer protocol.

In a preferred embodiment, each device 110 includes a cache, and is responsive to HTTP, SHTTP, and similar protocols. Each device is also responsive to local file access (by the device 110 itself), remote file access (both other devices 110), FTP, RSH, and similar protocols.

Management Consoles

Similar to the devices 110 and the configuration servers 120, each management console 130 preferably includes a processor, program and data memory, mass storage, and a network interface to the communication link 140. Each management console 130 is therefore capable of performing programmed processes and communicating with other elements of the system 100 using the communication link 140. Similar to the devices 110 and the configuration servers 120, the program and data memory in each configuration server 120 includes computer programs and data structures for performing steps described in this application. There is no particular requirement that the management console 130 must include mass storage.

Similar to the devices 110 and the configuration servers 120, one or more (or all of the) management consoles 130 can be located on the same physical device as one of the devices 110, in which case those devices 110 also include program and data information for performing the functions described herein for a configuration server 120.

Each management console 130 has associated with it a manager 131 (as further described above), such as a human operator capable of interacting with the management console 130 to create, edit, and delete both local configuration files 111 and remote configuration files 121, and to assign them to devices 110. There is no particular requirement that the manager 131 is actually a human operator; in alternative embodiments, the manager 131 can include a program for automatic management of configuration information or artificial intelligence software for performing general-purpose tasks.

Communication Link

In a preferred embodiment, the communication link 140 includes a LAN (local area network). However, in alternative embodiments, the communication link 140 may include any technique for communicating information, including without limitation a WAN (wide area network), an enterprise network, a VPN (virtual private network), a private or public switched network, or some combination or variant thereof.

There is no particular requirement that the communication link 140 must have any particular physical form, only that devices 110, configuration servers 120, and management consoles 130 can communicate with each other using the communication link 140. In a preferred embodiment, each element of the system 100 is accessible by each other element using a protocol such as HTTP, SHTTP, or a variant thereof. However, there is no particular requirement that such HTTP access must be direct access; the communication link 140 might include intermediate devices such as proxies, firewalls, NAT translators, and the like.

Method of Operation

Figure 2:
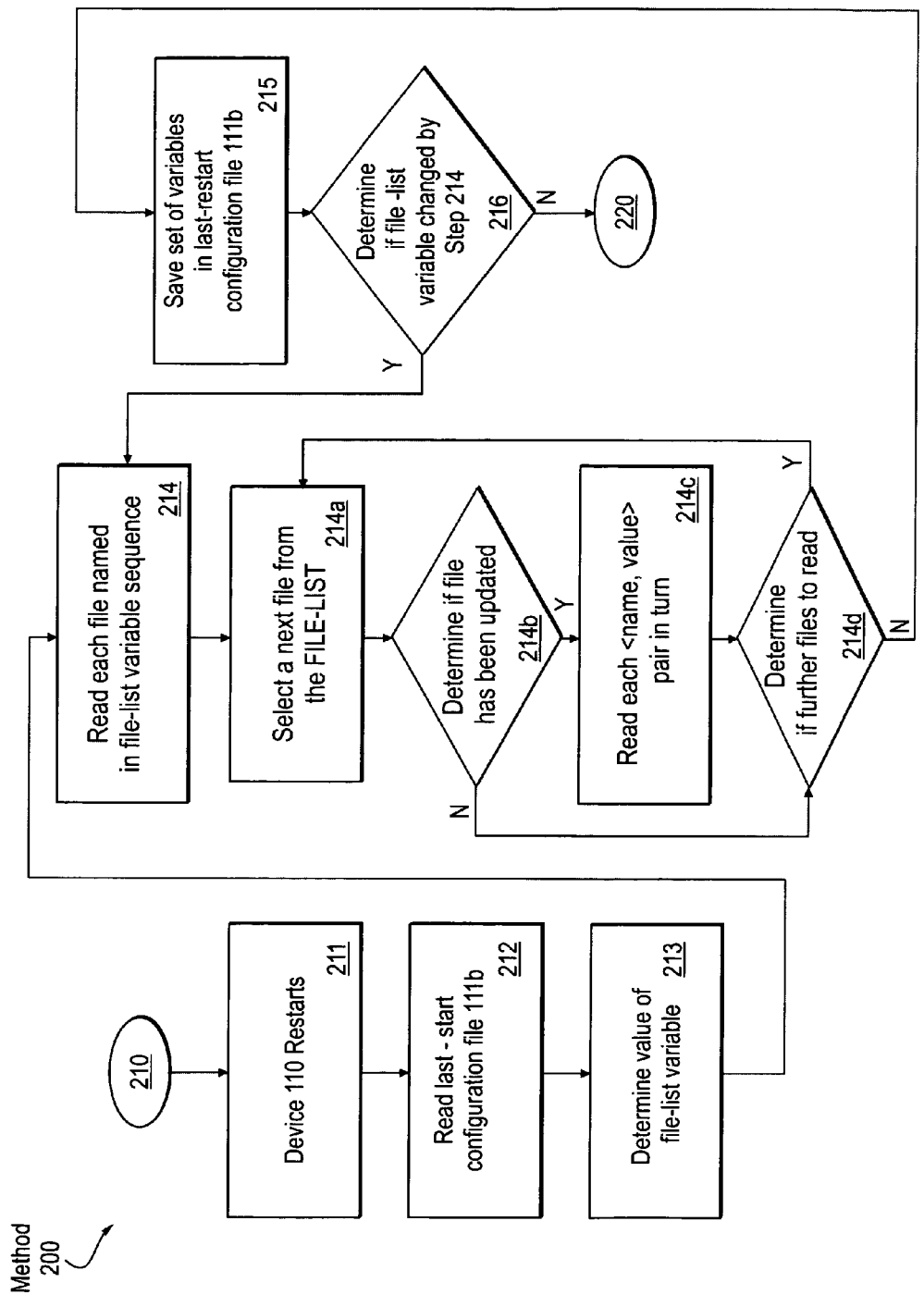
FIG. 2 shows a process flow diagram of a method including steps of managing information for a set of devices.

FIG. 2 shows a process flow diagram of a method including steps of managing information for a set of devices.

A method 200 includes a set of flow points and process steps as described herein.

Although by the nature of textual description, the flow points and process steps are described sequentially, there is no particular requirement that the flow points or process steps must be sequential. Rather, in various embodiments of the invention, the described flow points and process steps can be performed in a parallel or pipelined manner, either by one device performing multitasking or multithreading, or by a plurality of devices operating in a cooperative manner. Parallel and pipelined operations are known in the art of computer science.

At a flow point 210, the system 100 is ready to set configuration information for a device 110.

At a step 211, the device 110 restarts. Any individual device restart can be in response to one or more of a set of factors, including without limitation a hardware interrupt, a software panic (sometimes known as a "crash"), an operator command, a scheduled operation or some combination or variant thereof.

At a step 212, the device 110 reads its last-restart configuration file 111*b*. As part of this step, the device 110 reads a sequence of <name, value> pairs and sets the value of a set of variables, one for each <name> (having that name) equal to the corresponding <value>. One of these variables is a FILE-LIST variable, which describes the sequence of locations in which the device 110 looks for configuration information.

In a preferred embodiment, the FILE-LIST variable has a syntax including an initial delimeter (shown below as "\\"), a list of URL (uniform resource locator) values each on a separate line, and a final delimeter (shown below as "\\"). There is no particular requirement for using this syntax or these particular delimeters; any syntax or delimeters that could be consistently parsed by the devices 110 would suffice. Note that one of the URLs recited in the FILE-LIST variable has an "ftp:" prefix, indicating that the file is to be obtained using the FTP protocol.

\\
default.cfg
ftp://ncl-sun-0.lab.netapp.com/pub/global.cfg
local.cfg
\\

In a preferred embodiment, the default configuration file 111a (shown above as "default.cfg") is always named first in the list. A preferred embodiment explicitly recites the location of the default configuration file 111a in the FILE-LIST variable (which will be a variable named in the last-restart configuration file 111b). However, in alternative embodiments, the default configuration file 111a may be implicitly recited, that is, not recited but simply understood by the device 110 to come first.

At a step 213, the device 110 determines the value of the FILE-LIST variable.

At a step 214, the device 110 reads each file named in the FILE-LIST variable in sequence. As part of this step, the device 110 performs the following sub-steps:

At a sub-step 214(a), the device 110 selects a next file from the FILE-LIST variable. Initially, the "next" file is the first file designated by the FILE-LIST variable.

Although these sub-steps 214(a), 214(b), 214(c), and 214(d) are described as if changes to variables are made immediately, in a preferred embodiment, the device 110 assures that all files specified by the FILE-LIST variable are accessible before making those changes. Each device 100 thus avoids using a specified configuration until complete copies of all configuration files have been obtained, so that it can assure that when the values in each configuration file are applied, they include a complete set.

At a sub-step 214(b), the device 110 determines if selected file has been updated. If not, the device 110 skips that file and continues with the substep 214(d). Otherwise, the device 110 continues with the next sub-step.

At a sub-step 214(c), the device 110 reads each <name, value> pair from the selected file in turn. In a preferred embodiment, each <name, value> pair appears in one of the following syntactic forms:

name=value
name+=value

In either case, if the variable named <name> is not yet defined, it is defined and set equal to the associated value <value>.

If the variable named <name> is already defined, there is a difference in treatment depending on the choice of form. For the first syntactic form, the variable is set equal to the new value <value> without regard for its earlier value. In the second syntactic form, the variable has the new value appended to the earlier value.

At a sub-step 214(d), the device 110 determines if there are any further files to read. If so, the device 110 loops back to the sub-step 214(a). Otherwise, the device 110 continues with the next step.

If two inconsistent values are assigned to a single variable, the conflict can be resolved by determining, for any two sources for information about a set of values for named variables, a higher priority source and a lower priority source; parsing, from a higher priority source, an instruction relating to setting the variable; and performing the instruction from the higher priority source. The instruction can have a syntactic form indicating one or more of the following operations: replacing a value from the lower priority source with a value from the higher priority source, or appending a value from the higher priority source to a value from the lower priority source.

At a step 215, the device 110 saves its set of variables in the last-restart configuration file 111b, thus preserving the values associated with those variables for the next time the device 110 is restarted.

At a step 216, the device 110 determines if the FILE-LIST variable has been changed by performance of the step 214. If so, the method 200 goes back to the step 214. Accordingly, the method 200 will perform the step 214, the step 215, and the step 216 repeatedly until the FILE-LIST variable reaches a settled value.

At a flow point 220, the device 110 has set all its variables using the information in the local configuration files 111 and remote configuration files 121, and is ready to run.

GENERALITY OF THE INVENTION

The invention has general applicability to maintaining information for multiple devices. Although a preferred embodiment is described with regard to configuration information for a set of multiple caches, there is no particular limitation of the invention to caches or similar devices, nor is there any particular limitation of the invention to configuration information. Techniques used by a preferred embodiment of the invention for remotely maintaining information for multiple devices, for resolving conflicts at devices between differing sets of information, and for remotely maintaining information by multiple managers, can be used in contexts other than the specific applications disclosed herein.

Other and further applications of the invention in its most general form would be clear to those skilled in the art after perusal of this application. The invention would be usable for such other and further applications without undue experimentation or further invention.

Although preferred embodiments are disclosed herein, many variations are possible which remain within the concept, scope and spirit of the invention; these variations would be clear to those skilled in the art after perusal of this application.

The invention claimed is:

1. A method including
at a device, reading a set of information from a set of resources including at least a source local to said device and an information server remote from said device;
setting values for one or more variables at said device in response to said information; and
if said setting step changes an indication of said set of resources, re-performing the steps of reading and setting until said step of setting does not change said indication of said set of resources;
wherein said setting step resolves conflicts when said information from any two sources assigns two inconsistent values to any of said one or more variables by determining, for said any two sources, a higher priority source and a lower priority source.

2. The method as in claim 1, wherein said information includes configuration information used at start-up by said device.

3. The method as in claim 1, including
recording said information at selected times for said device;
at said device, reading said recorded information in addition to said set of information; and
comparing said recorded information with at least some of said set of information.

4. The method as in claim 3, wherein said selected times include at each restart of said device.

5. The method as in claim 1, wherein said set of resources includes at least a first file at said information server and a second file at a second information server.

6. The method as in claim 1, wherein said set of resources includes at least one file at said information server.

7. The method as in claim 1, wherein said information includes a set of values for named variables, and wherein said resolving conflicts further includes parsing, from said higher priority source, an instruction relating to setting said variable; and performing said instruction from said higher priority source.

8. The method as in claim 7, wherein said instruction has a syntactic form indicating one or more of the following operations:
   replacing a value from said lower priority source with a value from said higher priority source, or
   appending a value from said higher priority source to a value from said lower priority source.

9. The method as in claim 1, wherein said resources of said set of resources are disposed at a sequence of locations to be read by said device.

10. The method as in claim 9, further including defining a relative priority for said information server and a second information server in response to a relative position of said information server and second information server in said sequence.

11. The method as in claim 9, further including selecting said sequence of locations in response to said indication of said set of resources, which is settable in said setting step.

12. An apparatus including
   at least one information server;
   a device remote from said information server, said device including memory having computer programs and data structures capable of being performed by said device to perform steps of reading a set of information from a set of resources including at least a source local to said device and said information server, setting values for one or more variables at said device in response to said information, and if said setting step chances an indication of said set of resources, re-performing said steps of reading and setting until said step of setting does not change said indication of said set of resources;
   wherein said setting step resolves conflicts when information from any two sourcs assigns two inconsistent values to any of said one or more variables by determining, for said any two sources, a higher priority said source and a lower priority said source.

13. The apparatus as in claim 12, wherein said memory at said device includes computer programs and data structures that when performed use said information at start-up by said device.

14. The apparatus as in claim 12, said device including
   memory having a record of said information at some past time;
   memory including computer programs and data structures capable of being performed by said device to compare said recorded information with at least some of said set of information.

15. The apparatus as in claim 12, wherein said resources of said set of resources are disposed at a sequence of locations to be read by said device.

16. The apparatus as in claim 15, wherein a relative priority is defined for said information server and a second information server in response to a relative position of said information server and second information server in said sequence.

17. The apparatus as in claim 15, wherein said sequence of locations is selected in response to said indication of said set of resources, which is settable in said setting step.

18. A device including a processor and memory, said memory having computer programs and data structures capable of being performed by said processor
   to couple said device to an information server using a communication link;
   to read a set of configuration information from a set of resources including at least a source local to said device and said information server;
   to set values for one or more variables at said device in response to said configuration information, said configuration information being used at start-up by said device; and
   if setting said values changes an indication of said set of resources, to re-perform reading said set of configuration information and setting of said values until said setting of said values does not chance said indication of said set of resources;
   wherein said setting of said values resolves conflicts when said configuration information from any two sources assigns two inconsistent values to any of said one or more variables by determining, for said any two sources, a higher priority said source and a lower priority said source.

19. The device as in claim 18, including
   memory having a record of said information at some past time;
   wherein said computer programs and data structures are capable of being performed by said processor to compare said recorded information with at least some of said set of information.

* * * * *